United States Patent [19]

Damen et al.

[11] Patent Number: 4,466,121
[45] Date of Patent: Aug. 14, 1984

[54] METHOD AND DEVICE FOR CHARACTER SEGMENTATION

[75] Inventors: Jozef T. W. Damen, Leidschendam; Hong S. Tan, Zoetermeer, both of Netherlands

[73] Assignee: Netherlands Postal & Telecommunications Services, Leidschendam, Netherlands

[21] Appl. No.: 319,803

[22] Filed: Nov. 9, 1981

[30] Foreign Application Priority Data

Nov. 21, 1980 [NL] Netherlands .................... 8006371

[51] Int. Cl.³ .................................................. G06K 9/34
[52] U.S. Cl. .......................................... 382/9; 382/41; 382/48
[58] Field of Search ............. 382/9, 48, 28, 18, 51, 382/41

[56] References Cited

U.S. PATENT DOCUMENTS 4,206,442 6/1980 Miyazaki et al.

OTHER PUBLICATIONS

Wissenschaftliche Berichte A.E.G.-Telefunken, vol. 47, No. 3/4, (1974), J. Schürmann: "Bildvorbereitung fur die Automatische Zeichenerkennung", p. 90, T/M 99.
IBM Technical Disclosure Bulletin, vol. 21, No. 9, Feb. 1979, D. Bishop et al.: "Character Recognition Approach Involving Histogram Classification, pp. 3461–3467.
IBM Technical Disclosure Bulletin, vol. 14, No. 10, 1972, (Mar.), R. Baumgartner: "Character Pitch Determination", pp. 3104–3107.
IBM Technical Disclosure Bulletin, vol. 23, No. 3, Aug. 1980, C. Jih: "Segmentation Method for Fixed-pitch and Machine Printed Documents", p. 1194.
IBM Technical Disclosure Bulletin, vol. 15, No. 2, 1971, (Mar.), R. Hoffman et al.: "Segmentation Method for Recognition of Machine-printed Characters", pp. 153–165.

Primary Examiner—John C. Martin
Assistant Examiner—Michael D. Parker
Attorney, Agent, or Firm—Frishauf, Holtz, Goodman & Woodward

[57] ABSTRACT

Method and device for segmenting aligned characters. Each character is converted into a pattern of image elements. The image elements form columns and rows. The grey-values of the image elements are summed per column and the summed column values are put in relation with a fixed number of columns per character (1). After the outermost character position on a line has been found (2), a first segmenting process is carried out on the basis of a first probable distance between characters (3). After the segmenting process has been carried out for several different character distances ($S_1$–$S_n$), the correlation factor is determined (6), by means of which the segmentation, which precedes the character recognition, is carried out.

6 Claims, 6 Drawing Figures

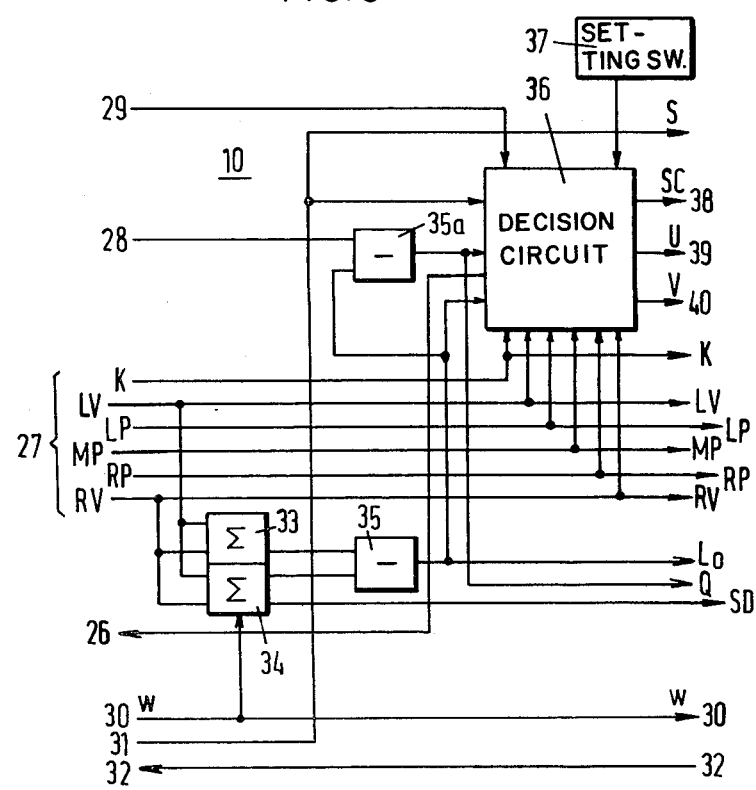

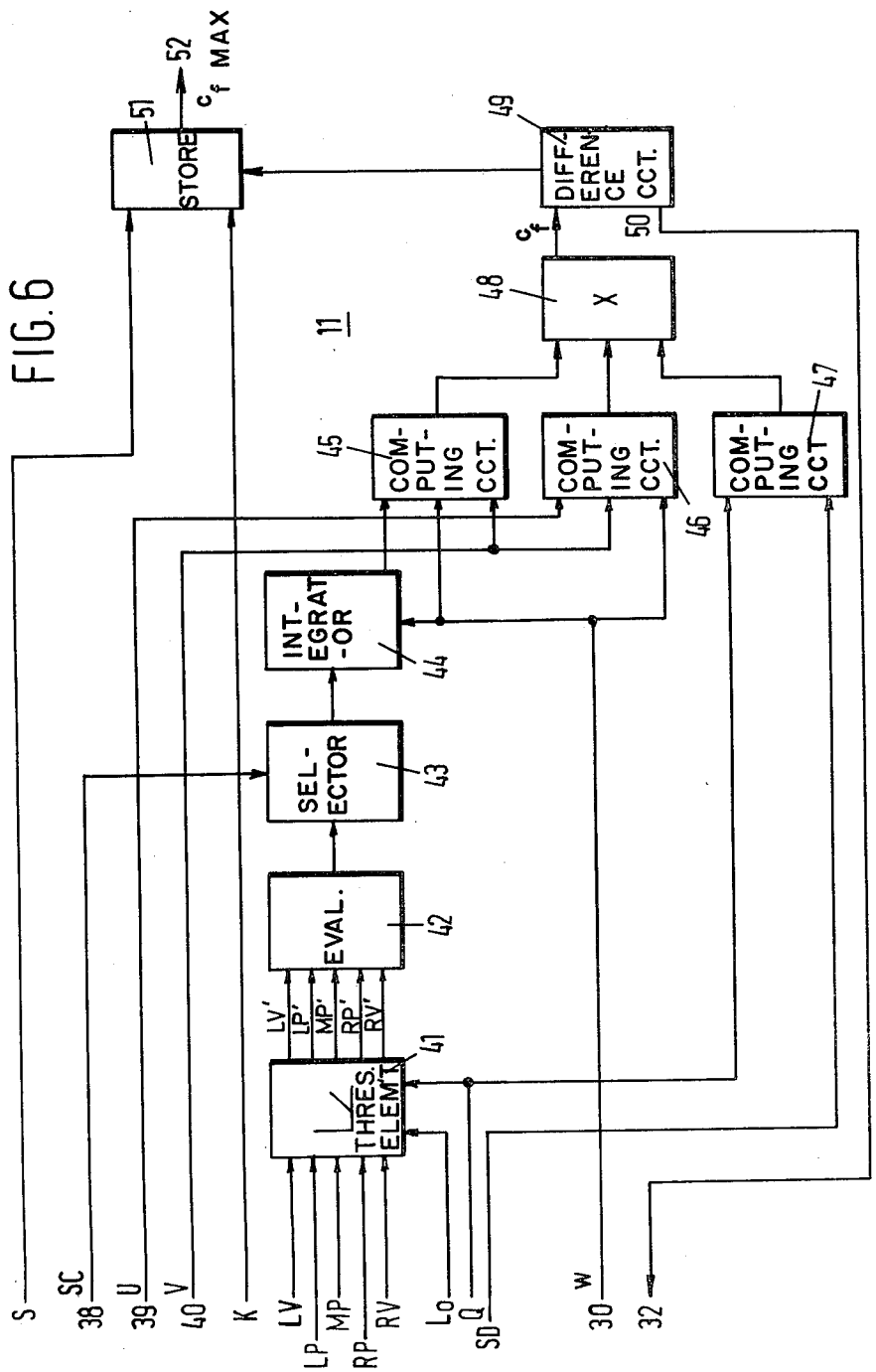

METHOD AND DEVICE FOR CHARACTER SEGMENTATION

The invention relates to a method and a device for segmenting substantially fixed-pitch aligned characters, in which each character is converted into an image-element pattern.

Methods and devices of this kind are common knowledge.

A disadvantage of known devices is that they are less suited for segmenting characters of poor quality.

In particular, addresses on postal articles consist of substantially fixed-pitch type-writer or line-printer characters. Nevertheless, owing to machine defects, these characters may exhibit such pitch deviations as to become hardly segmentable.

Recognizing a fundamental frequency in a signal is known per se from speech recognition technique, which, however, does not present the problem of spaces as in lines of characters. The very presence of these spaces in a character line can influence the fundamental frequency of the signal derived from the character line considerably. To avoid this disadvantage, it has been proposed to isolate the characters and to pass them consecutively to a recognition device in order to be recognized.

This procedure has the disadvantage that overlapping characters, or underlining of the character line, may disturb the functioning. Besides, it may be important, e.g. when recognizing characters on postal articles, to be able to recognize a specified group of characters.

It is an object of the invention to provide a method and a device of the above-mentioned type which do not present said difficulties.

The method and the device according to the invention are based upon the insight that the character pitch can be determined in a simple manner for an entire character line by applying, one by one, several combs having different tooth pitches to the character line and seeing, for each comb, how many characters and spaces are recognized by reading between the teeth.

The method according to the invention to be described hereinafter employs an electrical analogue of this procedure. Therefore the method according to the invention is characterized by determining an outermost character position on the character line to be segmented;

successively dividing the character line, with several different fixed pitches, into segments, starting from the outermost character position;

classifying each segment, with the aid of fixed criteria, according to its content as space segment, character segment or other segment;

determining the segment width with which, within the character line, the number of space and character segments classified is a maximum and the number of other segments classified is a minimum.

Another feature of the method according to the invention is that the outermost character position is determined by attributing a grey-value to each of the elements making up the character image by summing the grey-values of the image elements per column; by determining, in a constant proportion, a maximum, a minimum and a threshold of summed grey-values for the entire character line to be segmented and by selecting as outermost character position the set of grey-values summed per column, of which, seen from the end of the character line, the first column grey-value exceeds the threshold grey-value.

By a further feature of the method according to the invention, each of the segments is examined at a fixed number of points, of which, in the case the centre-line of a segment of a suitable width coincides with the centre-line of a character, at least one falls at one side and at least one falls at the other side of the character, at least one of the remaining points coinciding with a grey-value column of the character.

Further the invention provides a device for carrying out said method(s), comprising means for synchronizing the first segment with the first character on the character line, means for dividing the character line into segments, means for classifying the information found in each of the segments as a character, as a space or as a non-space and means for comparing the classification results obtained with the segment widths examined.

The invention will now be explained in detail, reference being made to the drawing, in which FIG. 1 is a block diagram illustrating the method according to the invention;

FIG. 2 exemplifies the conversion of characters (2a) into an image element pattern (2b) and the vertical projection (2c) of the grey-values of such an image element pattern;

FIG. 5 is a block diagram of a preferred embodiment of a classifying unit;

FIG. 6 represents a correlation circuit.

Figure 1:
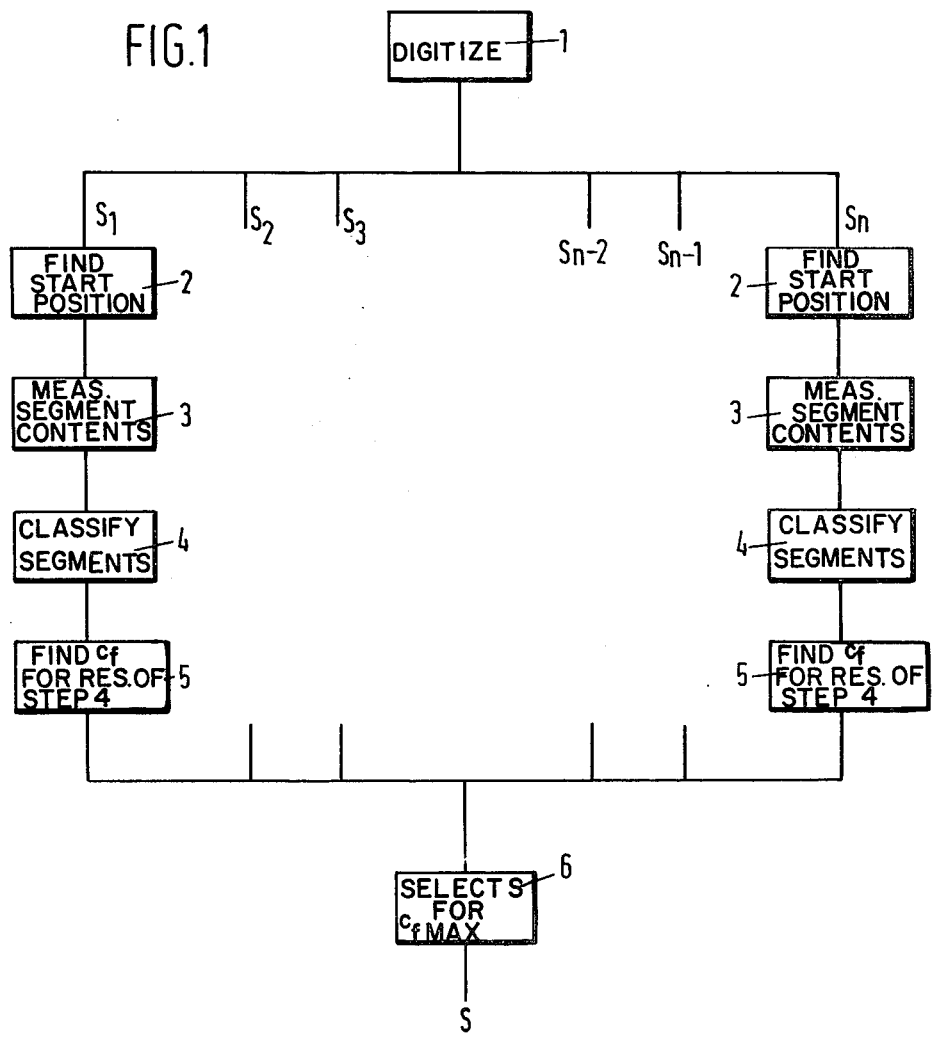

FIG. 1, in the shape of a functional block diagram, gives an impression of the method according to the invention.

In a first step, 1, the character line is digitized in a manner known per se.

In step 2 a start position is found for a first pitch S.

In step 3 the content is determined for every segment of the pitch chosen.

In step 4 it is determined which segments contain characters, which contain spaces and which contain non-spaces.

In step 5 a correlation factor is fixed for the results obtained by step 4 for the pitch chosen.

In the last step, 6, it is determined with which pitch the largest correlation factor has been fixed.

A more detailed explanation of each of these steps will be given hereinafter.

1. The digitizing process, comprising the conversion of a character line image into an image element pattern and the vertical projection thereof.

Figure 2:
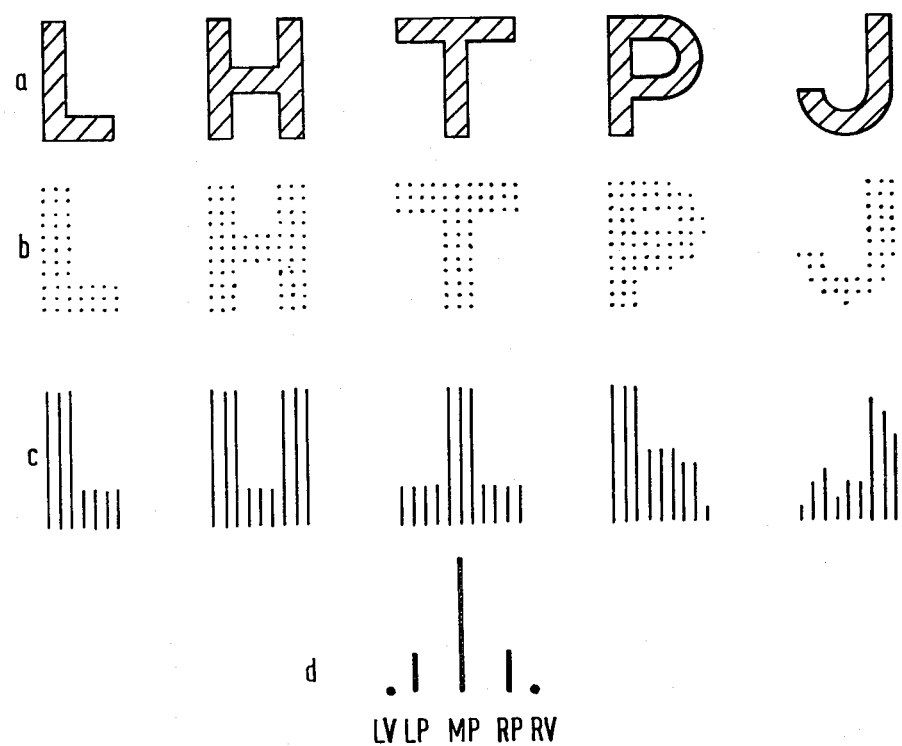

FIG. 2a represents a character line at random. This character line is converted first into an image element pattern (FIG. 2b). Now a value is attributed to each of the image elements, which is a measure for the grey-value of that image element. Then these grey-values of image elements are summed per column. FIG. 2c is a diagram of the grey-values thus added. For simplicity's sake, one and the same grey-value has been attributed to each of the image elements and the number of elements per character has greatly been reduced. In practice, the height of a character corresponds to approximately 32 image elements, the width of a character line to 256 image elements and the shade of grey of each character element can be expressed in 256 values.

The steps 2, 3, 4 and 5 that follow are carried out every time for a different segment width (pitch) and will be described for one segment width only, since they are identical for all segment widths.

2. Determining the start position of a line.

First, a segment width S is chosen. In practice, it proves sufficient when the smallest segment width chosen corresponds to 9 image elements and the largest corresponds to 30 image elements. In order to avoid that a large and varying number of column values has to be examined for each segment, a segment will be considered described by a small and fixed number of columns. In the embodiment described there are five columns. If a segment coincides exactly with a character area, in position with respect to the character as well as in width, the two outermost column positions must fall just outside the character, the grey-values of these column positions therefore being called left-hand valley (LV) and right-hand valley (RV), respectively. The remaining three column positions are called left-hand peak (LP), middle peak (MP) and right-hand peak (RP). By way of example, these five column positions are indicated in FIG. 2d for the middle character represented there. Practice has shown that distances $LV-LP=1/6S$, $LV-MP=\frac{1}{2}S$, $LV-RP=5/6S-1$ and $LV-RV=S+1$ are a good distribution.

Next, the maximum value MAX and the minimum value MIN of all the grey-value columns (FIG. 2c) of the entire line are determined. MIN need not necessarily be zero; if the character line to be segmented is underlined, MIN will give the grey-value of the underlining. Now an average grey-value level THRES is derived from the values MAX and MIN; it is defined as $$THRES = MIN + \alpha_{sync}(MAX - MIN), \quad (1)$$

in which $0 < \alpha_{sync} < 1$. In practice $\alpha_{sync} = 0.3$ proves to be a suitable choice.

Now, in order to determine the place of the first character, a so-called segment-positioning factor (SPF) is calculated; it is defined as $$SPF = (MAX - LV) + LP + MP + RP + - (MAX - RV) - |LV - RV| \quad (2)$$

Then the outermost grey-value on the character line is determined, which exceeds the average level THRES. The grey-value column in which this level occurs first is designated by $k_0$. Now the SPF is determined for every grey-value column for which $$k_0 - S/2 < k < k_0 + S/2. \quad (3)$$

The grey-value column in which SPF is a maximum is called $k_1$ and is considered start position for the line. Now the grey-value column $k_1$ is deemed to coincide with the left-hand valley LV of the first segment $w_1$. The combined steps described, provided for synchronizing the first segment with the first character, are referred to as synchronization.

3. Segmenting the character line.

Starting from the grey-value column $k_1$ the SPF for the area between $k_1$ and $k_1 + S$ is determined first. The values for $k_1$ and SPF are recorded in one store. Then the starting-line for the next segment is determined by $k_1 + S$. Because the division of the character line into points gives rise to sampling errors, the SPF is determined of each of the segments beginning at $k_2 - 1$, $k_2$ and $k_2 + 1$, respectively. The k-value with which the largest SPF is found, is regarded as the correct one and serves as starting-point for determining $k_3$. If, however, no grey-values exceeding the values THRES are found over a width S, the segment is assumed to contain a space and the next k is determined by $k_w + S$. In this manner a starting value k is determined for each segment w, as well as a value for SPF and the values LV, LP, MP, RP and RV.

4. Classifying the content of the segment.

As soon as the above-mentioned values have been determined for all the segments, an average value LAV and a standard deviation SD are determined for all the values of LV and RV.

$$LAV = \frac{1}{2W} \sum_{w=1}^{W} (LV + RV) \quad 4)$$

It is obvious that the standard deviation will be zero, if each segment fits exactly to a character. The average value LAV represents the background noise, which can also result from the above-mentioned underlining of the character line. So in the case of a correct segmentation, the background noise $L_0$ can be defined as $$L_0 = LAV - SD \quad 5)$$

A measure Q for the usable information is then $$Q = MAX - L_0 \quad 6)$$

The following criteria can be used to decide whether a segment contains a space or a character:

(1) a space decided on, if the grey-value levels of all the columns within a segment are smaller than or equal to $$L_0 - \alpha_s Q, \quad 7)$$

0.3 being suitable value for $\alpha_s$ in practice;

(2) a character is decided on, if the grey-value of a column exceeds $L_0 + \alpha_s Q$ and if at the same time $$LV < L_0 + \alpha_v Q \text{ and} \quad 8)$$
$$RV < L_0 + \alpha_v Q \text{ and}$$
$$LP > LV \text{ and}$$
$$RP > RV \text{ and}$$
$$MP > L_0 + \alpha_m Q \text{ or } MP > LV \text{ and } MP > RV;$$

(3) in all other cases the segment contains neither a character nor a space by the criteria employed and is referred to as a non-space.

5. Determining the correlation factor.

As has been described hereinabove, every character line is covered every time with a different series of segments having equal or nearly equal widths. To find the pitch with which the most characters or spaces coincide with a segment, a correlation factor $C_F$ is attributed to each segmenting result. Therefore a value SC is attributed to each segment in the following manner. In order to eliminate the influence of the background noise $L_0$ and thereby suppress the disturbing influence of any underlining, each grey-value column is normalized between $L_0$ and $L_0 + Q$ (formula 6). The values thus normalized for LV, LP, MP, RP and RV are designated by LV', LP', MP', RP', and RV', respectively.

For a space segment, containing a space, $$SC = 0. \qquad (9)$$

For all other segments $$SC = 1 - LV + LP + MP + RP + 1 - RV \qquad (10)$$

The total value TSC for a line divided into segments is determined by summing the values of all the segments. The correlation factor referred to hereinabove is determined by the value TSC, the number of segments U in which a character is found, the number of segments V in which a space is found, the standard deviation SD and the value Q that has been found, in the following proportion:

$$C_F = \frac{TSC}{W-V} \times \frac{U}{W-V} \times \left(1 - \frac{SD}{Q}\right) \qquad (11)$$

6. Fixing the largest correlation factor.

A process as has been described in the above paragraphs 2 to 5 is carried out on each of the segment widths deemed possible. A correlation factor $C_F$ can be determined for each of these pitches. It is clear that the pitch giving the highest correlation factor $C_F$ is the most probable pitch.

The method according to the invention thus provides a reliable segmentation of characters and spaces on a character line and has the particular advantage that, thanks to the designation of each segment, certain groups of spaces and characters can easily be recognized. Thus the place of a postcode can be detected in a simple manner.

Figure 3:
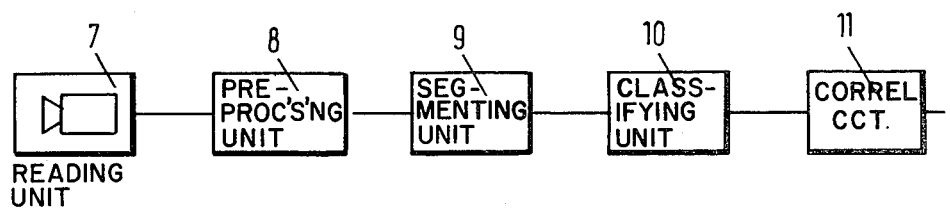
FIG. 3 is a block diagram of a device according to the invention.

The device according to the invention consists substantially of the parts represented in FIG. 3. It comprises a reading unit 7, which converts the optical signal of the character lines to be segmented into an electric signal consisting of image elements. Such a unit may comprise a TV camera or a series of diodes and is otherwise generally known. A pre-processing unit 8 ensures the detecting and correcting of crooked character lines or characters that are not printed straight. The pre-processing unit 8 ensures, by known techniques, the conversion of the signal coming from the reading unit 7. As the height of every character is represented by at most 32 image elements and each element, as has been stated, can appear in 256 shades of grey, all the image elements of one column can be represented by 13 bits, since $2^8 \times 2^5 = 2^{13}$. The width of a character line comprises 256 image elements, so that the total information digitized by the pre-processor 8 can be represented by $256 \times 13$ bits. The process by which this is done is generally known and will not be explained here, since it is no essential part of the present invention.

Figure 4:
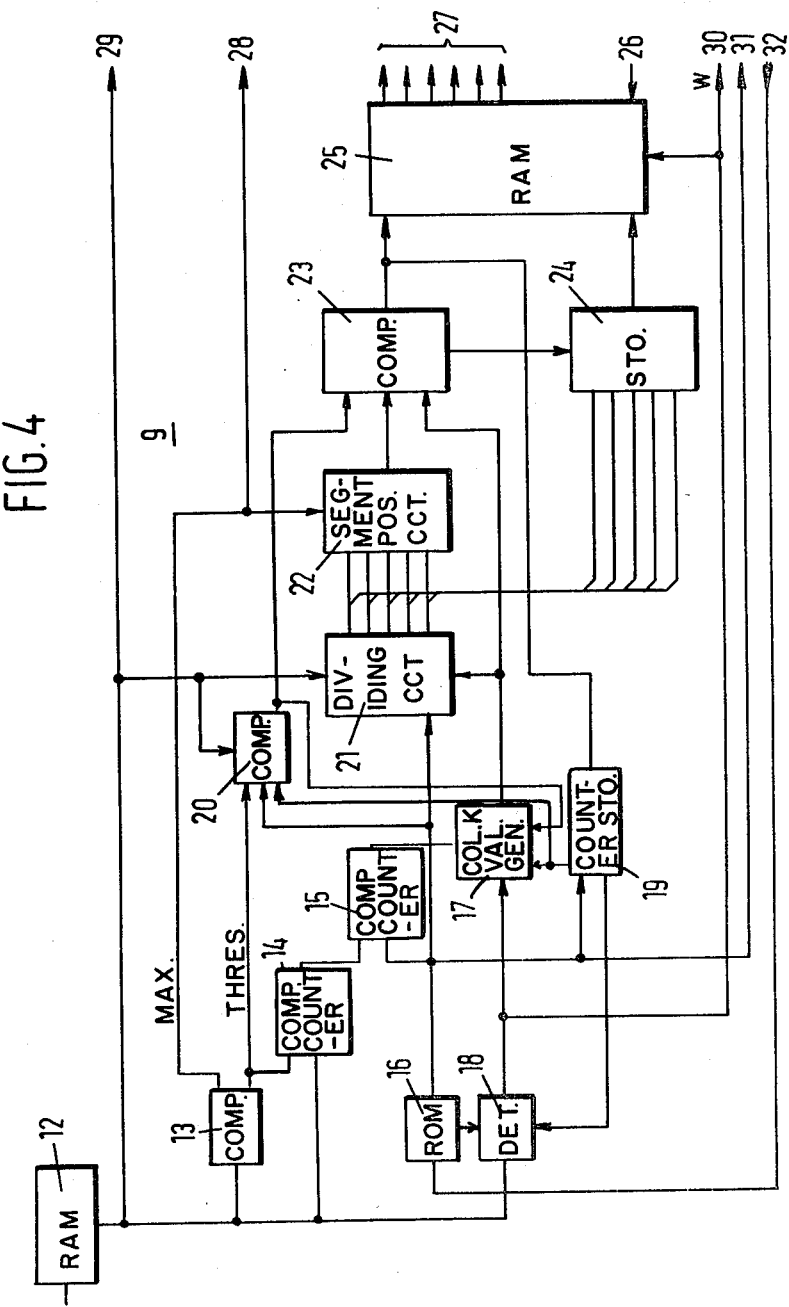
FIG. 4 is a block diagram of a preferred embodiment of a synchronizing and segmenting unit.

The electric analogue of the image of FIG. 2c is fed to a synchronizing and segmenting unit 9, which is shown in more detail in FIG. 4. A classifying unit 10 classifies the segments found according to their nature - character, space or non-space - by the criteria elucidated hereinabove.

FIG. 5 is a more detailed representation of the classifying unit. The classification data found are fed to a correlation circuit 11, which determines the maximum correlation factor. The electric analogue of the image elements projected, which is fed to the synchronizing and segmenting unit 9, is recorded in a $256 \times 13$ bit addressable store (RAM) 12 (FIG. 4).

A comparator 13 determines the levels THRES and MAX, after which a comparator-counter 14 detects the first image-element column $k_0$ of which the value recorded in store 12 exceeds the THRES-level. A comparator-counter 15 compares the values stored in 12 over a number of steps between the limits $k_0 \pm S_V$, for which the value indicated by store (ROM) 16 is used. In the first cycle the value stored in ROM 16, representing the examined segment width in image-elements, will remain unchanged. In practice a lowest value of 9 image elements for $S_V$ proves to be amply sufficient.

A generator 17 generates the values for column k at which the first character is assumed to be present and compares the value of k with that of a detector 18, which can determine the highest value of the co-ordinate in store 12 at which a possible character is still detected. A counter-store 19 determines the next value every time after a first value k has been found, as explained in the method description. A comparator 20 examines whether the area indicated by the k-generator 17 contains a sufficient number of values. If no grey-values higher than THRES are found, a signal is given at the output, to indicate that the segment examined has been recognized as a space. Now, a segment dividing circuit 21 determines, on the basis of the content of store 12, the segment width concerned and the k-values given by generator 17, the positions of five points $P_0$, $P_1$, $P_2$; $P_3$ and $P_4$; in practice, the following positions prove to result in a suitable distribution, with the relevant values of w and $S_V$:

$$P_0 = k; P_1 = k + \frac{S}{6}; P_2 = k + \frac{S}{2};$$

$$P_3 = k + \frac{5S}{6} - 1; P_4 = k + S + 1.$$

A segment positioning circuit 22 derives the segment positioning factor from the values LV, LP, MP, RP, and RV found at points $P_0$ to $P_4$ by formula (2) stated hereinabove. A comparator 23 holds the latest SPF-value and replaces it by a next SPF-value, if this next value is larger. The values LV, LP, MP, RP and RV associated with the largest SPF-value are recorded every time in a store 24. The initial co-ordinate k and the co-ordinates of points $P_0$ to $P_4$ for which SPF is a maximum are recorded column by column in a tabular RAM 25 for every segment number w supplied by classification unit 10 via input 26. Further, circuit 9 has output terminals 27, via which the values recorded in store 25 can be passed to the further circuit; output terminals 28, 29, 30 and 31, for outputting the maximum cumulative grey-value level, the content of store 12, the total number of segments W of the line and the number of image points per segment S, respectively, and an input terminal 32, for changing the address of store 16 in order to set a different value for the pitch S. The classification unit 10, represented in more detail in FIG. 5, comprises an adder 33, which adds up the values LV and RV from store 25, in order to determine the average value LAV of the grey-values in the left-hand and right-hand valley of each segment. Therefore adder 33 carries out the following operation:

$$LAV = \frac{1}{2W} \sum_{w=1}^{W} (LV + RV)$$

A circuit 34 calculates the standard deviation SD of the values LV and RV. As has been observed already, these two values are a measure for the correctness of the segment width S chosen, since, with a correct segment width the standard deviation SD will be nearly equal to zero. Now, a subtracter 35 determines the difference between the average value LAV and the standard deviation SD. A subtracter 35a subtracts the value found by 35 from the maximum grey-level MAX and the value Q thus found -see formula (6) - is fed to a decision circuit 36, which, on the basis of the values of the pitch S set, the number of segments W, the summed grey-values LV, LP, MP, RP and RV, the co-ordinates k and the values stored in register 12 (FIG. 4), determines which of the segments contains a space, a character or a non-space. The values for $a_{sync}$, $a_S$, $a_V$, $a_M$ and $a_C$ can be set by means of a switch 37. A segment containing a space is signalled on output 38, a segment containing a character on output 39 and a segment containing a non-space is signalled on output 40. Further, the values LV, LP, MP, RP, RV, Q, $L_0$, SD and w are output to the correlation circuit 11 represented in FIG. 6. Correlation circuit 11 contains a threshold element 41 for normalizing each of the values LV, LP, MP, RP and RV with respect to the average grey-value $L_0$ and the value Q. The values thus normalized are fed to an evaluator 42, which carries out the operation of formula (10). Under the control of SC, a selector 43 passes, in the case of a space, the value "0" to its output, and if the relevant segment contains no space, it passes the value fixed by 42. An integrator 44 adds up the values fixed by circuit 42 for all segments, in order to find the TSC-value. Computing-circuit 45, computing-circuit 46 and computing-circuit 47 calculate the three factors for formula 11, after which multiplier 48 determines the value for $C_F$.

A difference circuit 49 compares the value of $C_F$ with preceding $C_F$-values associated with other S-values and passes, via output 50, a signal back to input 32 (FIG. 4), in order to set ROM 16 to the next value of S. Every time, a store 51 records the largest value found for $C_F$, together with the associated segment width S. When a correlation factor $C_F$ has been determined for each of the S-values, the value of the segment width S for which the correlation factor $C_F$ is a maximum appears at output 52. It is self-evident that the device described above for carrying out the method(s) according to the invention is only one of a plurality of embodiments.

Further, the character and space patterns can be derived from the outputs 27 of store 25, so that the place of a specified character configuration, as a postcode, can be derived in a simple manner.

The invention thus provides a device for carrying out the method described hereinabove, which, even with a poor quality of print, guarantees a good segmentation of the character line.

What we claim is:

1. Method for segmenting substantially fixed-pitch aligned characters, in which each character is converted into an image-element pattern, characterized by
   determining an outermost character position on the character line to be segmented;
   successively dividing the character line, with several different fixed pitches, into segments, starting from the outermost character position;
   classifying each segment, with the aid of fixed criteria, according to its content as space segment, character segment or other segment;
   determining the segment width with which, within the character line, the number of space and character segments classified is a maximum and the number of other segments classified is a minimum.

2. Method according to claim 1, characterized in that the outermost character position is determined by
   attributing a grey-value to each of the elements making up the character image;
   summing the grey-values of the image elements per column;
   determining, in a constant proportion, a maximum, a minimum and a threshold of summed grey-values for the entire character line to be segmented and
   selecting as outermost character position the set of grey-values summed per column, of which, seen from the end of the character line, the first column grey-value exceeds the threshold grey-value.

3. Method according to any one of the preceding claims, characterized in that each of the segments is examined at a fixed number of points, of which, in the case the centre-line of a segment of a suitable width coincides with the centre-line of a character, at least one falls at one side and at least one falls at the other side of the character, at least one of the remaining points coinciding with a grey-value column of the character.

4. Device for segmenting substantially fixed-pitch aligned characters having means for converting each character into an image-element pattern and means for summing the grey-value for each column of elements, characterized by the provision of means for synchronizing the first segment with the first character on the character line, means for dividing the character line into segments, means for classifying the information found in each of the segments as a character, as a space or as a non-space and means for comparing the classification results obtained with the segment widths examined.

5. Device according to claim 4, characterized in that the synchronizing means comprise a comparator (13) for comparing the grey-values of the columns and fixing a threshold value, a store (12) for recording the grey-values of each of the columns, a first comparator-counter (14) for comparing the grey-values recorded in the store (12) for recording the threshold value fixed by the comparator (13), a store (ROM) (16) for fixing the segment width, a second comparator-counter (15) for fixing a position of a grey-value column at a distance of half a segment width from the place, determined by the first comparator-counter (14), of the outermost grey-value column recorded in store(12), which exceeds the threshold value fixed by the comparator (13).

6. Device according to claim 5, characterized by provision of a segment divider (21) for determining, by a fixed rule, five points in the segment fixed by the segment width store (16), determining the grey-values associated with these five points and recorded in grey-value store (12), and passing these grey-values to a segment positioning circuit (22) for determining the position of a character or a space with respect to the position of a segment, on the basis of the maximum grey-value levels fixed by the comparator (13).

* * * * *